(12) United States Patent
Mahowald

(10) Patent No.: US 10,104,303 B2
(45) Date of Patent: Oct. 16, 2018

(54) ILLUMINATION SYSTEMS AND METHODS FOR COMPUTER IMAGERS

(71) Applicant: Apple Inc., Cupertino, CA (US)

(72) Inventor: Peter H. Mahowald, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/404,951

(22) Filed: Jan. 12, 2017

(65) Prior Publication Data

US 2017/0201664 A1    Jul. 13, 2017

Related U.S. Application Data

(60) Continuation of application No. 14/581,894, filed on Dec. 23, 2014, now Pat. No. 9,571,745, which is a division of application No. 12/006,637, filed on Jan. 3, 2008, now Pat. No. 8,922,672.

(51) Int. Cl.
| | |
|---|---|
| *H04N 5/235* | (2006.01) |
| *H04N 7/14* | (2006.01) |
| *H04N 7/15* | (2006.01) |
| *H04N 5/225* | (2006.01) |
| *H04N 5/232* | (2006.01) |
| *H04N 9/73* | (2006.01) |

(52) U.S. Cl.
CPC ......... *H04N 5/2351* (2013.01); *H04N 5/2256* (2013.01); *H04N 5/2354* (2013.01); *H04N 5/23293* (2013.01); *H04N 7/147* (2013.01); *H04N 7/15* (2013.01); *H04N 9/73* (2013.01)

(58) Field of Classification Search
CPC . A61B 2562/04; A61B 3/0008; A61B 3/0025; A61B 3/005; A61B 3/063; G09G 5/10; H04N 1/00307; H04N 1/00835; H04N 5/2258; H04W 52/027
USPC ........................................................ 348/348
See application file for complete search history.

(56) References Cited

U.S. PATENT DOCUMENTS

| | | | |
|---|---|---|---|
| 5,617,139 | A | 4/1997 | Okino |
| 6,379,022 | B1 | 4/2002 | Amerson |
| 7,146,041 | B2 | 12/2006 | Takahashi |
| 7,362,356 | B2 | 4/2008 | Ikeda |
| 7,532,191 | B2 * | 5/2009 | Kim ............... G09G 3/3406 345/102 |
| 7,602,969 | B2 | 10/2009 | Yamada |
| 7,643,068 | B2 | 1/2010 | Hyodo |
| 7,667,766 | B2 | 2/2010 | Lee |

(Continued)

OTHER PUBLICATIONS

"High Dynamic Range Imaging." http://en.wikipedia.org/wiki/high_dynamic_range_imaging, 5 pages, accessed on Jan. 2, 2008.

*Primary Examiner* — Trung Diep
(74) *Attorney, Agent, or Firm* — Blank Rome LLP

(57) ABSTRACT

The present invention can provide solutions to many common imaging problems, such as, for example, unevenly distributed illumination, shadows, white balance adjustment, colored ambient light and high dynamic range imaging. Imaging systems and methods can be provided through a computer (e.g., laptop or desktop) such that the system or method can take advantage of the computer's processing power to provide functionality that goes beyond typical camera. Such an imaging system may include an imaging device, a camera, a light source and a user interface.

20 Claims, 9 Drawing Sheets

(56) References Cited

U.S. PATENT DOCUMENTS

| | | |
|---|---|---|
| 7,733,383 B2 | 6/2010 | Kato |
| 8,125,562 B2 | 2/2012 | Shaw |
| 9,332,167 B1* | 5/2016 | Pance ................ H04N 5/2258 |
| 2002/0113881 A1 | 8/2002 | Funston |
| 2004/0246348 A1 | 12/2004 | Takeshita |
| 2005/0012852 A1 | 1/2005 | Gann |
| 2005/0190288 A1 | 9/2005 | Yamada |
| 2005/0219394 A1 | 10/2005 | Du |
| 2007/0014554 A1 | 1/2007 | Sasaki |
| 2007/0248342 A1 | 10/2007 | Tamminen |
| 2008/0106636 A1 | 5/2008 | Wernersson |
| 2008/0122821 A1* | 5/2008 | Nilsson ................ G03B 17/20 |
| | | 345/207 |
| 2008/0252749 A1 | 10/2008 | Fujiwara |
| 2009/0040364 A1 | 2/2009 | Rubner |
| 2009/0073275 A1 | 3/2009 | Awazu |
| 2009/0109129 A1* | 4/2009 | Cheong ................ G09G 5/02 |
| | | 345/20 |

* cited by examiner

ILLUMINATION SYSTEMS AND METHODS FOR COMPUTER IMAGERS

BACKGROUND OF THE INVENTION

This relates imaging systems.

Most imaging systems use artificial lights, such as a camera flash, to illuminate a scene for image capture. Systems typically use these artificial lights to emit the same color and brightness of light when an image is captured. Therefore, traditional imaging systems have limited control over the light used to artificially illuminate a scene for image capture and are incapable of changing the color or brightness of the light in response to preexisting lighting conditions (i.e., ambient light).

In other instances, when images are to be captured, there is no choice but to turn on the room lights, such as during traditional video conferencing. This can present problems, particularly in instances where it is desired to keep room lights off. Thus, there is a need to provide improved imaging systems and methods.

SUMMARY OF THE INVENTION

The present invention can provide solutions to many common imaging problems, such as, for example, unevenly distributed illumination, shadows, white balance adjustment, colored ambient light and high dynamic range imaging. In some embodiments, the imaging systems and methods are provided through a computer (e.g., laptop or desktop) such that the system or method can take advantage of the computer's processing power to provide functionality that goes beyond typical camera.

In one embodiment, an imaging system can include an imaging device, a camera, a light source and a user interface. The system an analyze captured images to determine if light is evenly balanced across the image and, if not, adjust the intensity of one or more lights to balance the light so that a higher quality image can then be captured.

In other embodiments, the system can collect data from the surrounding environment which can then be analyzed to generate ambient light parameters. The system can then vary the illumination to the image target (the object or scene that is to be captured) based on the ambient light parameters. The image would then be captured while the adjusted illumination was activated.

In other embodiments, the system can capture a first image while the scene is illuminated, and then capture a second image when the illumination is either turned off or turned away from the scene. To produce the "captured image", the system can then combine the two images to produce the final image, which should be of a higher quality than either of the captured images.

In another embodiment, the system collects data regarding the scene. The scene can be divided into portions and ambient light parameters can be generated for each portion. For example, the ambient light parameters may indicate that one or more portions may be dimly reflecting while other portions may be brightly reflecting. Illumination can then be provided appropriate to the reflectivity since the illumination would be based on the ambient light parameter for each portion instead of a single ambient light analysis.

In yet another embodiment, the scene can still be divided into portions, each of which can be analyzed to produce a separate ambient parameter. The system could then illuminate one portion at a time, and capture the image of that portion. Once all of the portions have captured, the system could then combine the images into a single image.

In another embodiment of the present invention, the system can capture images of a scene under multiple levels of illumination, and combine the images into a single image. For example, the system can illuminate the scene with a certain light level appropriate to the most reflective area of the scene and capture an image of the scene under that illumination. Before the scene changes, for example, due to subject movement, the system can illuminate the scene with a different light level appropriate, for example, to the least reflective area of the scene, and capture an image of the scene under the different light level. The system also can capture images of the scene under other intermediate illumination levels (in any order). Once all of the brightness levels have been captured, the system then can combine the images into a single image.

In another embodiment, the system can include an image capturing device, such as a digital camera, processing circuitry and one or more illumination devices. The processing circuitry can be configured to analyze the ambient light in the scene surrounding an object to be "captured." This can be done either as a single analysis or as a series of portion analyses. The image(s) is then captured; in the case of portions, the series of sub-images are captured and then combined.

Persons of ordinary skill in the art will appreciate that the various embodiments described herein can be combined with other described embodiments or other embodiments without departing from the spirit of the present invention.

BRIEF DESCRIPTION OF THE DRAWINGS

The above and other advantages the present invention will be apparent upon consideration of the following detailed description, taken in conjunction with accompanying drawings, in which like reference characters refer to like parts throughout, and in which.

DETAILED DESCRIPTION OF THE INVENTION

The present invention relates to imaging systems. An imaging system is an electronic system which is able to capture an image. In one embodiment, imaging systems can include an imaging device and any number of accessories.

Figure 1:
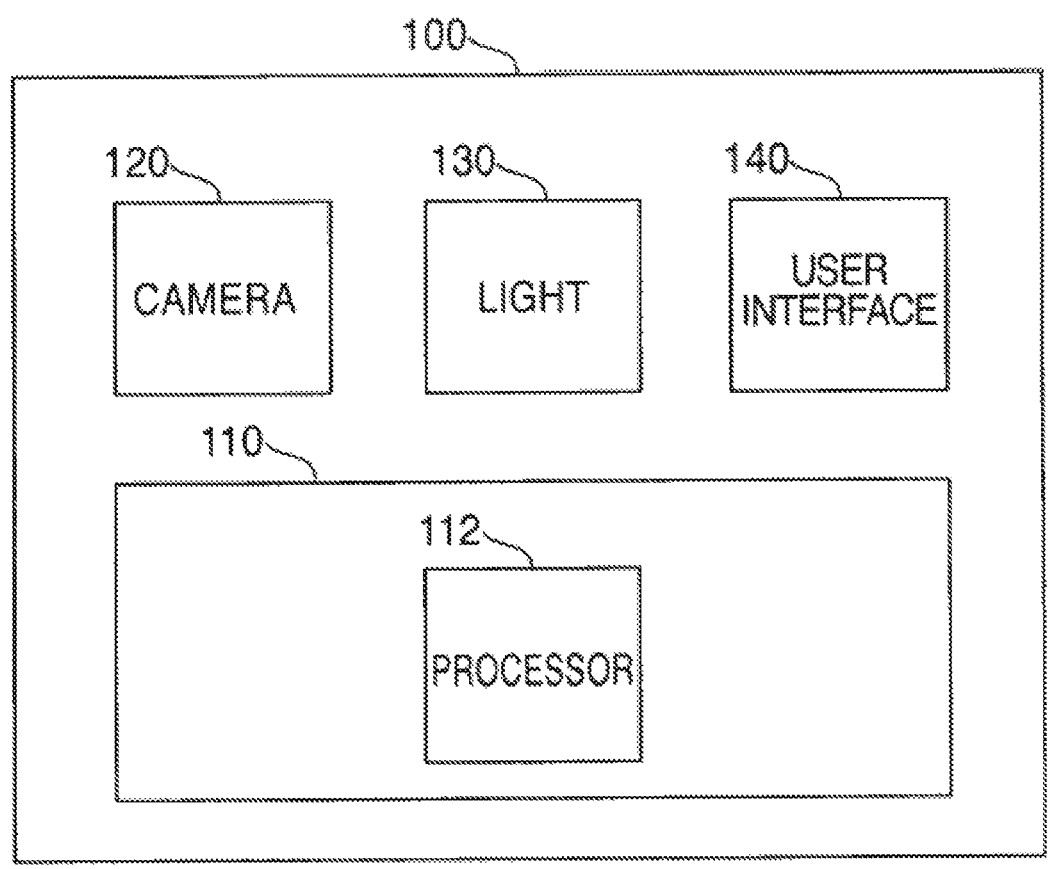
FIG. 1 is a simplified diagram of an exemplary imaging system in accordance with an embodiment of the present invention.

FIG. 1 is an illustration of exemplary imaging system 100 in accordance with one embodiment of the present invention. In one embodiment, imaging system 100 may perform functions in addition to image capture. For example, imaging system 100 can be a computer that also performs complicated processes (e.g., word processing and mathematical calculations). In another embodiment, imaging system 100 can be a camera. Imaging system 100 can include imaging device 110, camera 120, light 130 and user interface 140.

Imaging device 110 can coordinate the functions of imaging system 100. Processor 112 can be provided within imaging device 110 or it can be provided in another component of imaging system 100. Processor 112 can, for example, include a processor, a field-programmable gate array, an application-specific integrated circuit, or a combination of individual logic components. Processor 112 can include circuitry that is optimized for processing digital images. Imaging device 110 can include memory and other circuitry (not shown). For example, imaging device 110 can include circuitry for storing or transmitting captured images.

Camera 120 can include a lens and one or more sensors that generate digital images. The sensors of camera 120 can be provided on a charge-coupled device (CCD) integrated circuit, for example. Camera 120 can include dedicated image processing circuits for converting signals from one or more sensors to a digital format. Camera 120 can also include circuitry for pre-processing digital images before they are transmitted to imaging device 110.

light 130 can generate light to aide in capturing images. Light 130 can include one or more types of lighting elements, such as an incandescent bulb, a halogen bulb, a fluorescent bulb, a high-intensity discharge lamp, a light emitting diode (LED), an arc lamp, an electronic xenon flash lamp, a microflash or other suitable lighting element. Imaging system 100 may be able to control the color and brightness of illumination from light 130.

In one embodiment, light 130 can include one or more lighting elements of different colors. The one or more elements can be independently adjusted to output light of varying intensity (e.g., brightness). By adjusting the relative intensity of differently colored lighting elements, the light source can emit a large range of colors. For example, if red, green and blue lighting elements are used, the relative intensity of each element can be adjusted to create a blend of light that corresponds to an RGB color. In addition to one or more colored elements, it may be advantageous to also include a substantially white lighting element which can efficiently add to the total intensity of light without significantly affecting the color.

User interface 140 can receive user instructions. For example, user interface 140 can include individual buttons, a keyboard, a pointing device (e.g., a mouse), or a touch-screen display. In one embodiment, a user can employ user interface 140 to control when and how imaging system 100 captures images User interface 140 can also present information to a user. User, interface 140 can include a display screen, an audio system, or a projector. User interface 140 can display previously captured images to a user, for example. User interface 140 may also instruct a user on how to configure imaging system 100.

In some embodiment, imaging system 100 may include an ambient light detector (not shown). An ambient light detector may be used to measure the brightness and color of preexisting lighting conditions. This information may be useful in order to properly control light 130 such that a scene is illuminated appropriately when an image is being captured. An ambient light detector can be included in any portion of system 100, such as in imaging device 110, camera 120, light 130 or user interface 140. Alternatively to or in combination with an ambient light detector, a sample image may be captured by camera 120 to measure the preexisting lighting conditions for the same purpose.

In some embodiments, camera 120, light 130, and user interface 140 can be separate accessories that work with imaging device 110. Camera 120, light 130, and user interface 140 can connect with each other or imaging device 110 through a wired or wireless connection.

Alternatively, any one of imaging device 110, camera 120, light 130, and user interface 140 can be combined into a multi-function device. For example, camera 120 and light 130 can be combined into one device that communicates with imaging device 110. In another example, imaging device 110, camera 120, light 130, and user interface 140 can all be combined into a single device (e.g., a laptop computer or a digital camera).

In one embodiment of the present invention, light 130 and user interface 140 can be combined in the form of a display screen (e.g., CRT screen, plasma screen, or LCD screen). A display screen may be a desirable light because it can generate light that varies in both brightness and color. A display screen can also be a user interface because it can present information to a user. Moreover, a display can also receive instructions from a user if it is a touch-screen.

It is understood that one or more cameras, lights, or user interfaces can be included in an imaging system without deviating from the spirit or scope of the present invention. For example, an imaging system may include multiple lights to illuminate a scene from multiple angles for image capture.

Figure 2A:
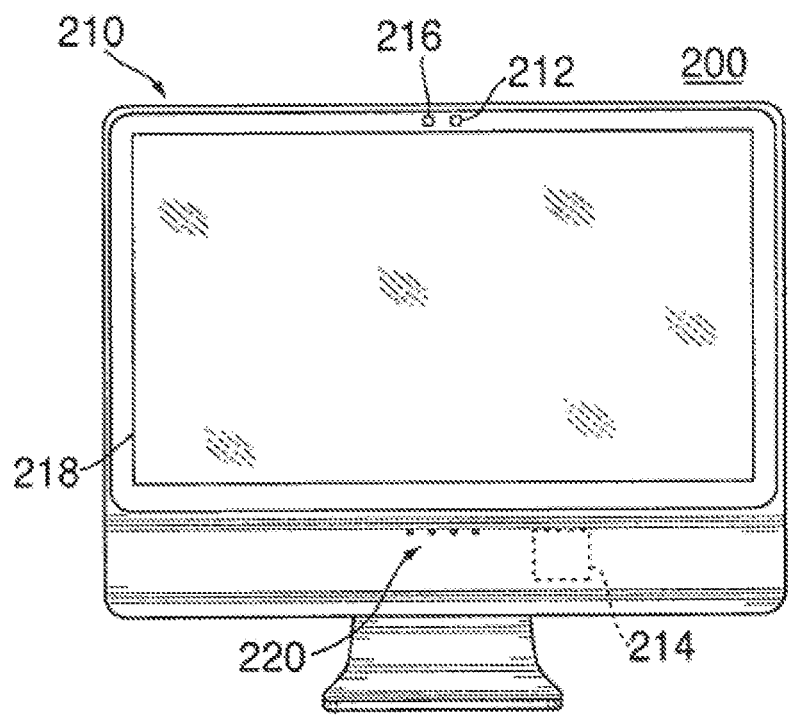
FIGS. 2A-2C are illustrations of an exemplary integrated light in accordance with an embodiment of the present invention.

FIG. 2A is an illustration of imaging system 200 in accordance with one embodiment of the present invention. Imaging system 200 can include imaging device 210 (e.g., imaging device 110 of FIG. 1).

In one embodiment, imaging device 210 can be a computer. Imaging device 210 can include a processor (e.g., processor 112 of FIG. 1) that controls the functions of imaging device 210 and any external components (e.g 210 cameras, lights or user interfaces). Imaging device 210 can also include memory (not shown) for storing configuration data and captured images.

Imaging device 210 can include embedded camera 212 and connectors or a wireless system for communicating with one or more external cameras. Embedded camera 212 can be embedded within the housing of imaging device 210, and any external cameras might include their own housing. Embedded camera 212 and any external cameras coupled with device 210 may be comparable to camera 120 of FIG. 1.

Embedded camera 212 and any external cameras can capture images. Embedded camera 212 and any external cameras may be able to convert captured images to digital pictures or may transmit a signal to a processor in device 210 for conversion. Embedded camera 212 can be positioned in imaging device 210 so that, for example, it is aimed at the area where a user's face would typically be when using imaging device 210. In some embodiments, embedded camera 212 may be movable such that it can be pointed in a particular direction. External cameras may be positioned and aimed independently of imaging device 210. Processor 214 can control when and how camera 212 and any external cameras capture images.

Imaging device 210 can include embedded light 216 and connectors or wireless systems for communicating with one or more external lights. For example, an external light can include one or more lighting elements mounted on a tri-pod and can be wirelessly connected to an imaging system. Embedded light 216 can be incorporated into the housing of imaging device 210. Embedded light 216 and any external lights ay be comparable to light 130 of FIG. 1.

Embedded light 216 and any external lights can provide it during image capture. For example, embedded light 216 can be positioned in imaging device so that, for example, it is pointed in the same direction as camera 212. In some embodiments, embedded light 216 may be movable so that it can be pointed in a particular direction. Processor 214 can control the color and intensity of light emitted by embedded light 216 and any external lights.

Embedded light 216 and any external lights can include one or more lighting elements. The lighting elements of embedded light 216 and any external lights can be different colors such that the combination of light creates a particular color. In one embodiment, embedded light 216 and any external lights can include three colored lighting elements and one white lighting element. For example, the lighting elements can include a red LED, a green LED, a blue LED and a white LED. The colored lighting elements can be independently controlled (e.g., by a processor in device 210) to emit light of different relative intensities. The relative intensities can be selected so that the blend of light from all three sources creates a desired color. Additionally, the white lighting element can be illuminated in order to add to the overall intensity of light generated by light sources.

Embedded light 216 and any external lights may include driver circuitry (not shown). Driver circuitry can, for example, receive an electronic signal with color and timing information and convert into individual signals to drive one or more lighting elements. Driver circuitry can ensure that each lighting element is illuminated at the designated time with the designated intensity. Driver circuitry can change the intensity of light from lighting elements by adjusting the signal used to power the element. Driver circuitry can, for example, vary the duty cycle, current flow or any other suitable aspect of a signal to control the brightness of each lighting element. Driver circuitry store electrical energy. For example, driver circuitry can include one or more batteries or capacitors for storing energy that allows lighting elements to output quick bursts of high intensity light even if the power supply's current is limited.

Imaging device 210 can include display screen 218, buttons 220, and connectors or a wireless system for communicating with one or more external user interface accessories (e.g., a keyboard or a mouse) (not shown). Display screen 218, buttons 220, and external user interface accessories may be comparable to user interface 140 of FIG. 1. Display screen 218, buttons 220, and any external user interface accessories may be coupled with a processor in device 210. A user can employ buttons 220 and/or any external user interface accessories to provide input to imaging system 200. Display screen 218 can present the output of imaging system 200 to a user.

Display screen 218 can also function as a light source that provides illumination during image capture. For example, processor 214 can instruct display screen 218 to output a predetermined amount and/or color of light while camera 212 is capturing an image. One example of this embodiment is described in greater detail below with respect to FIG. 2C.

It is understood that any external cameras, external lights, or external user interface accessories can connect with imaging device 210 through one or more electrical connections (e.g., USB or Firewire cables) or wireless communications.

Figure 2B:
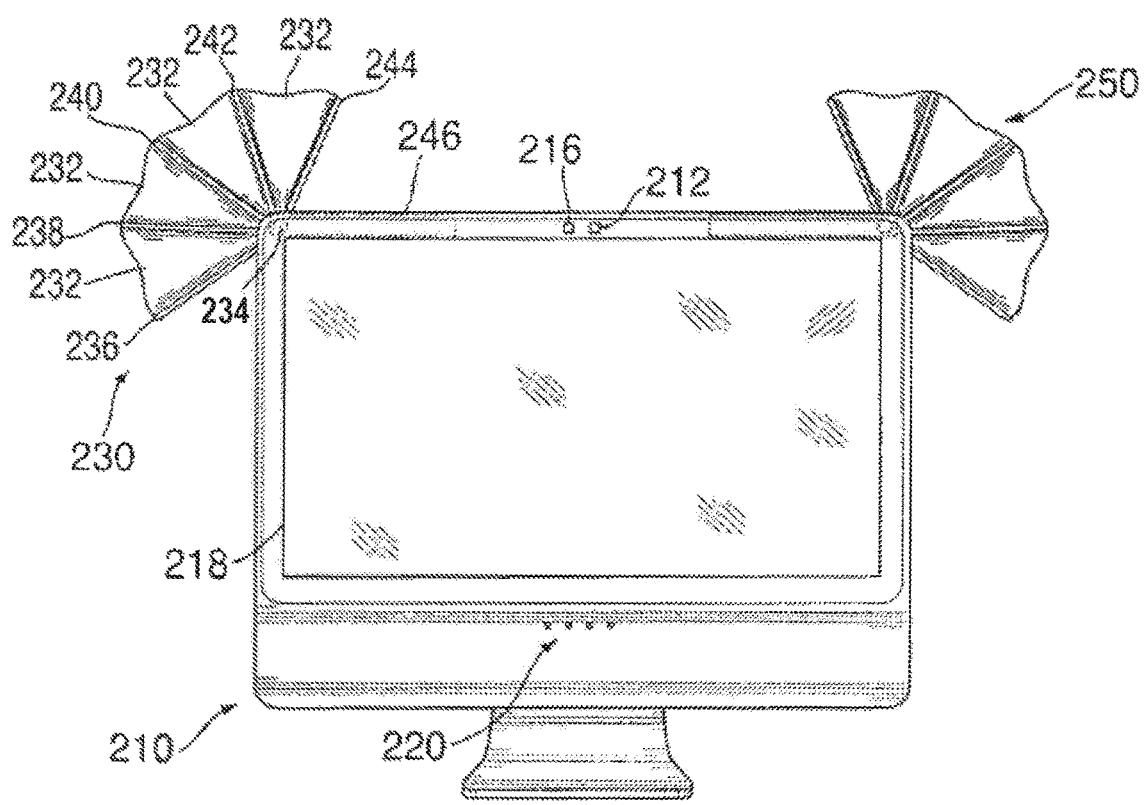

Alternatively or n addition to light 216, device 210 may include embedded lights 230 and 250 in accordance with one embodiment of the present invention. FIG. 2B is an illustration of imaging system 200 with embedded lights 230 and 250 deployed. Embedded lights 230 and 250 may be comparable to light 130 of FIG. 1. Embedded lights 230 and 250 can provide illumination during image capture. A processor in device 210 can control the deployment and operation of embedded lights 230 and 250. Embedded light 250 is similar to embedded light 230, and the following description of the embedded light 230 can also be applied to embedded light 250.

Embedded light 230 can include a reflector 232 and one or more lighting elements 234. Reflector 232 can include material that reflects light. Lighting elements 234 can be aimed at the front surface of reflector 232 such that any light from lighting elements 234 reflects off of reflector 232 in a manner that provides substantially even illumination. When fully deployed, reflector 232 can be tilted towards the front of imaging device 210 such that light reflected from lighting elements 234 is directed towards a person using device 210.

Embedded light 230 can include support appendages 236-244. Support appendages 236-244 can be used to support deploy/stow reflector 232. Support appendages 236-244 can extend radially from a corner of imaging device 210. The ends of support appendages 236-244 can be pivotally engaged with a joint in the corner of imaging device 210. The position of support appendages 236-244 can be controlled by a motor (not shown) imaging device 210. Support appendages 236-244 can be made of a material that is substantially rigid enough to support reflector 232.

Reflector 232 can be coupled with support appendages 236-244 by affixing the reflector to the appendages using, for example, an adhesive or other suitable coupling means. For example, appendages 236 and 244 can be coupled to the edges of reflector 232, and appendages 238-242 can be coupled to the rear surface of reflector 232. Appendages 238-242 can be coupled to reflector 232 at evenly spaced intervals.

Embedded light 230 can be stowed such that reflector 232 and support appendages 236-244 are located within cavity 246. Embedded light 230 can be stowed by, for example, rotating support apertures 236-244 about a pivot point in the corner of device 210. Reflector 232 can be flexible so that when embedded light 230 is stowed, the reflector can be easily compressed or folded. Appendage 236 can be shaped to fit the opening of cavity 246 such that the cavity is cannot be easily seen when embedded light 230 is stowed. Imaging device 210 of FIG. 2B can resemble imaging device 210 of FIG. 2A when embedded lights 230 and 250 are stowed.

It is to be understood that the above imaging systems are provided solely for the purposes of illustration and that other imaging systems can be used without deviating from the spirit and scope of the present invention.

In one embodiment of the present invention, an imaging system (e.g., system 100) may include one or more lights (e.g., light 130) and the system may be able to adjust the one or more lights to properly illuminate a scene.

Figure 2C:
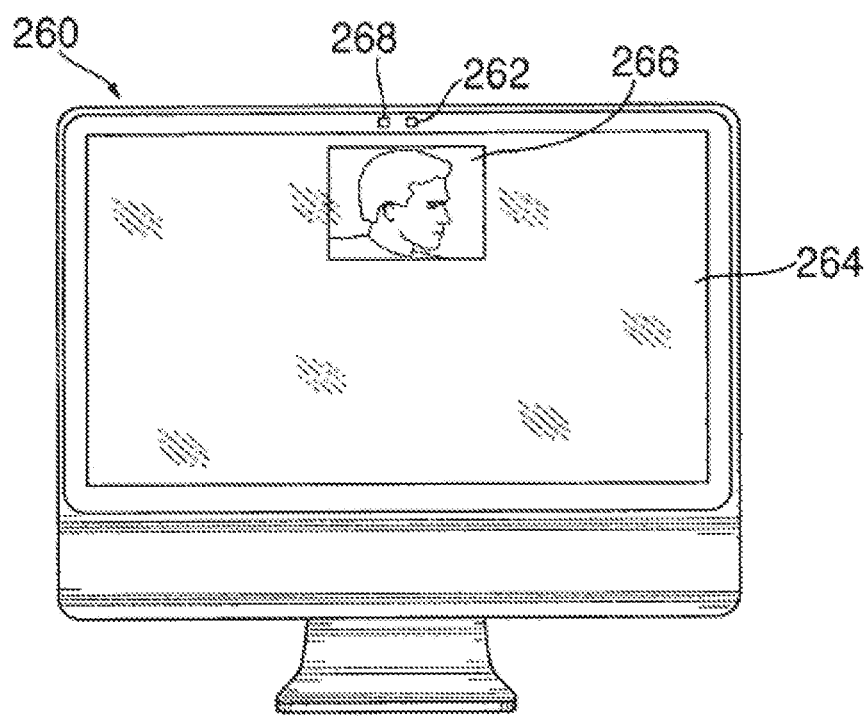

FIG. 2C is an illustration of another exemplary integrated light in accordance with an embodiment of the present invention. Imaging system 260 can be configured to use a display screen as the light for illuminating a subject during, for example, a video-conference. In one embodiment, imaging system 260 can include embedded camera 262 and connectors or a wireless system for communicating with one or more external cameras. Imaging system 260 also can include screen 264 on which image 266 of the subject can be presented during the video-conference. While image 266 can be disposed anywhere on screen 264, the image can be placed near camera 262 so that the subject appears to be looking into the camera as he observes the transmitted image. The remainder of screen 264 can set to bright white light (e.g., RGB=255, 255, 255) to illuminate the subject as brightly as possible. The remainder of screen 264 also can be set to an illumination level based on the level of ambient light detected by one or more photodetectors 268.

Based on an analysis of the color balance of image 266, imaging system 260 also can adjust the screen color. For example, if the image appears too blue, the RGB values may be set to 240, 255, and 255, respectively. Imaging system 260 also can capture multiple images of a subject and adjust the illumination level and color of screen 264 to create, for example, uniform and color-balanced light for the subject. For example, the imaging system can take images with and without screen illumination on during the exposure (see, e.g., the discussion corresponding to FIG. 5A). When screen illumination is not desired (e.g., to take an image only with ambient light), screen 263 can be black. Image 266 also can be dimmed or blackened momentarily during the exposure.

Figure 3:
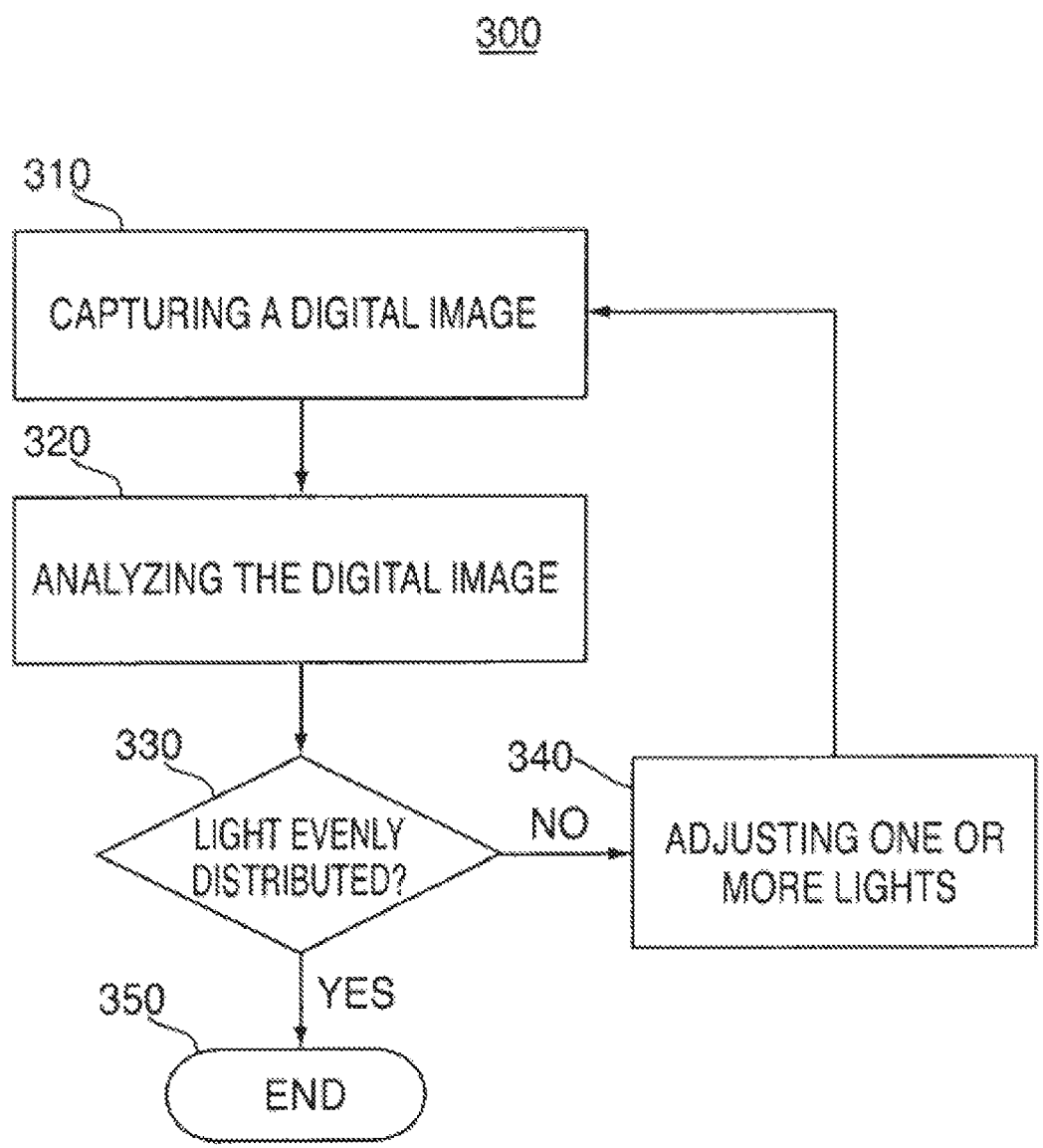
FIG. 3 is a flowchart of an illustrative method for capturing a digital image using one or more lights in accordance with an embodiment of the present invention.

FIG. 3 shows an illustrative flowchart of method 300 for capturing an image in accordance with an embodiment of the present invention. During method 300, lights may be adjusted by instructing a user to move their position or adjusting their relative brightness.

At step 310, a digital image can be captured. The image can be captured using a camera (e.g., camera 120). In some embodiments, such as systems with independently moveable lights, a system may record the position of the lights when the image is captured. The position of each light may be determined automatically (e.g., based on wireless communications) or may be provided through a user input.

At step 320, the digital image can be analyzed. The camera used to take the image or a processor in the imaging device (e.g., processor 112) can analyze the image. Analyzing an image can determine if any lights are improperly positioned by detecting shadows or bright spots in the image. In one embodiment, an image can be analyzed to identify any regions of high and low color pixel saturation to g., areas with a large number of light or dark red, green, and/or blue pixels). For example, regions of the image with a large number of light pixels may be categorized as bright spots and regions with a large number of dark pixels may be categorized as shadows.

In some embodiments, the entire, image may be analyzed as a whole to identify any groupings of light or dark pixels. In some embodiments, the image may be broken down into pre-defined regions (e.g., 4 or 16 regions) and each region may be analyzed separately to determine if it is a bright spot, a shadow or neutral. As part of the analysis, the imaging system may determine whether or not the light in the image is evenly distributed. For example, the imaging system may use the locations of the bright spots and/or shadows in the image to determine if the light is not uniform. For example, a large number of bright spots on one side of an image may indicate that a light on that side is unevenly illuminating the image. In some embodiments, the imaging system may use the relative locations of the bright spots and shadows. For example, if many pairs of bright spots and shadows are identified and the bright spots are always to one side of the shadows then a light on that side may be unevenly illuminating the image.

At step 330, method 300 may diverge depending on the analysis performed in step 320. If the imaging system determines that the light in the image is unevenly distributed, method 300 may proceed with step 340. At step 340, the system may adjust one or more lights to correct the deficiency. For example, the system may instruct a user to reposition one or more lights. The system may provide specific instructions to a user detailing which light to move and where to place it. The system may instruct the user through a user interface (e.g., user interface 140). The system may adjust one or more lights automatically through wired or wireless connections.

In some embodiments, the system may adjust the relative brightness of one or more lights. In embodiments where a display screen is used as a light, the light can be adjusted by illuminating different areas of the display screen. This adjustment of the display screen is comparable to changing the position of the light. For example, if only one side of the display screen is illuminated during image capture, the resulting image may resemble an image that was generated with an external light placed on that side. After the one or more lights have been adjusted, the system may proceed with step 310 and capture another image. At this point, method 300 would then analyze the new image and make another determination of whether or not the light is evenly distributed.

If the imaging system determines that the light is evenly distributed, method 300 may end with step 350. At step 350, the system may store the image in memory. For example, the image may be stored on memory in an imaging device (e.g., device 110). The position of the lights, if known, may be stored so that it is appended to or part of the image data. This data may provide useful information about the image at a later time and may be useful for editing the image.

Figure 4:
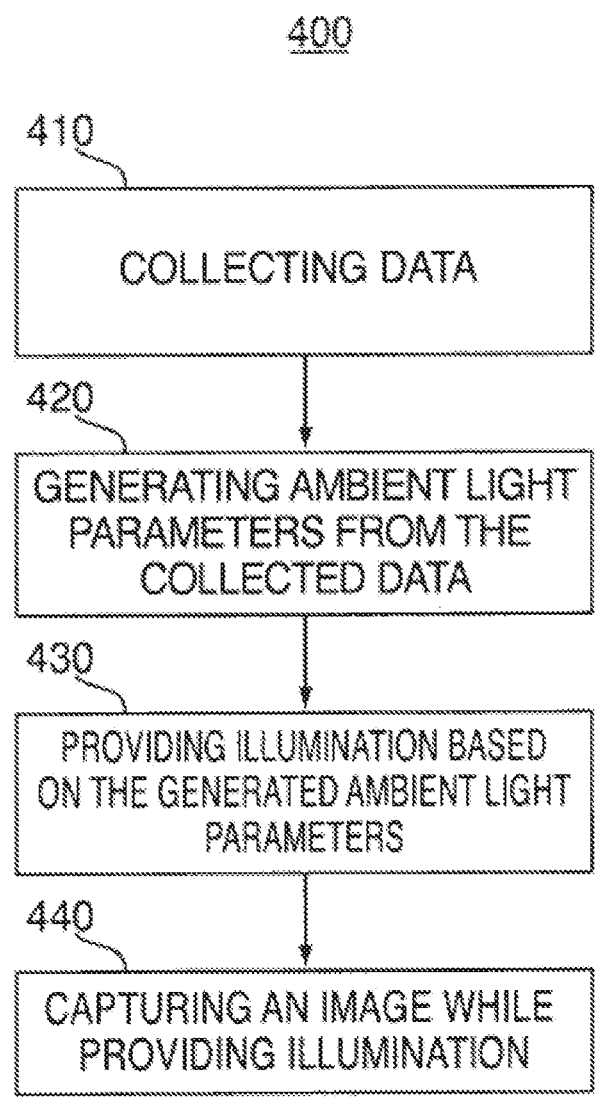
FIG. 4 is a flowchart of an illustrative method for capturing a digital image using automatic white balancing through illumination in accordance with an embodiment of the present invention.

FIG. 4 shows an illustrative flowchart of method 400 for capturing an image in accordance with one embodiment of the present invention. According to method 400, an imaging system (e.g., system 100) can collect data from one or more sources and generate ambient light parameters from the collected data. After generating parameters, the system can then illuminate a scene (e.g., using light 130) according the parameters and capture an image during the illumination. Compared to traditional image capturing with standard illumination, method 400 can result in higher quality images with truer colors.

At step 410, data can be collected from one or more sources. The collected data can reflect characteristics of the ambient light in a scene. An imaging system can collect data from one or more types of sources, including a photodetector (e.g., a CCD array in camera 120 or an ambient light sensor), a user input device (e.g., user interface 140), or another imaging system.

For example, data can be collected from the output of one or more photodetectors. For example, the photodetectors can be provided through a CCD array in a camera (e.g., camera 120). Alternatively, the one or more photodetectors can be provided through an ambient light sensor (e.g., one or more photodetectors located behind colored filters). Compared to a camera, an ambient light sensor may provide less accurate data about ambient light but may be less expensive and not require as much signal processing or power consumption. In either form, the data can be previously collected for other purposes (e.g., the last image taken by the camera, a previous frame of a video feed or a measurement to adjust the brightness of a display screen) such that collecting the data merely requires accessing the previous data. For example, collecting the data may be accomplished by accessing a previously captured image. In other embodiments, data can be collected for the primary purpose of gaining information about ambient light.

Additionally or alternatively, a user can manually input data about ambient light through a user interface (e.g., user interface 140). This can be advantageous if a user has a separate, more accurate sensor than the sensor provided in an imaging system. However, this form of data can also be generated from less precise user inputs. For example, a user may be able to indicate what the conditions are when an image is captured (e.g., direct sunlight, shade, fluorescent lighting).

In some embodiments, data can be collected from another imaging system. For example, if an additional imaging system is subject to the same lighting conditions, the two systems can use the same data. Sharing data between imaging systems can be advantageous if the systems are generating images that will later be associated together and, therefore, may need to be illuminated in a similar manner.

In some situations, data may be collected while an imaging system was providing illumination. In such a situation, information about the illumination (e.g., color and intensity) can be incorporated into the data. This information can be used at a later time to compensate for any effects that the illumination may have on the collected data. For example, when the data is processed the illumination provided by the system at the time of data collection may be used to account for the effect of that illumination.

At step 420, ambient light parameters can be generated from the collected data. Ambient light parameters can reflect the color and intensity of ambient light in a scene. For example, ambient light parameters can include a measurement for each of the three primary colors of light (i.e., red, blue, and green). Ambient light parameters may include the color temperature of the ambient light.

There are several algorithms that can be used to generate ambient light parameters. In one embodiment, the color value of all pixels in an image can be averaged to determine the color and intensity of ambient light in the image. In some embodiments, the color value of each pixel may be weighted based on its position in the image. For example, a pixel on the edge of an image might have less weight that a pixel near the center of the image in determining the overall ambient light. If an imaging system provided illumination when the image was captured, the color of that illumination can be used to adjust the average color value of all of the pixels.

In another embodiment, an imaging system can automatically identify an object in an image and assume that it is white. The system can then average the color value of the pixels corresponding to the object to determine the color and intensity of ambient light when the image was captured. In one embodiment, an imaging system may instruct a user to hold up a white object that can be used to determine the color of ambient light in the image. In another embodiment, an imaging system can automatically identify objects that are typically white (e.g., buttons on a shirt) and can analyze the pixels corresponding to that object. In some embodiments, a user may be able to provide an input specifying what portion of an image the system can assume is white. Moreover, components of an imaging system (e.g., a mouse or a keyboard) can be colored white such that, if they are shown in an image, these components can be used as reference objects when determining the color and intensity of ambient light.

In yet another embodiment, an imaging system can identify neutrally colored metal objects and can analyze the pixels showing light reflected off of those objects to characterize the color and intensity of ambient light when the image was captured.

For imaging systems that use an ambient light sensor, generating ambient light parameters may not require as much image processing. For example, the color and intensity of ambient light can be determined by measuring data from the sensor. In some embodiments, the measured data may be adjusted to compensate for any illumination provided by the system when the data was collected.

Other algorithms for determining the color and intensity of ambient light in an image are well known in the art. Any of these algorithms can be used without deviating from the spirit or scope of the present invention.

Ambient light parameters can be generated by software running on a processor. Alternatively, a system can use application specific hardware to process data and determine ambient light parameters. Such a processor or application specific hardware can be located anywhere in an imaging system. For example, application specific hardware can be provided in a camera (e.g., camera 120) or in an imaging device (e.g., device 110).

At step 430, an imaging system can provide illumination based on the generated ambient light parameters. An imaging system can use one or more lights (e.g., light 130) to provide illumination. A light can be incorporated into an imaging device (see, e.g., light 2130 or display screen 2140) or external to an imaging device (e.g., an external light). Illumination can be provided for a period of time that is suitable for image capture.

The illumination provided by an imaging system can have a particular color and/or intensity that is selectively chosen according to one or more ambient light parameters. An imaging system with multiple light sources can provide different illumination from each light source.

The illumination provided by an imaging system can be used to balance the color of a scene. In one embodiment, the illumination car be a color that is substantially complementary to the detected ambient light's color. For example, if ambient light parameters identify that the ambient light is primarily composed of red light, the imaging system can provide illumination that is primarily composed of green and blue light (or yellow and blue light).

It is to be understood that the color of illumination provided by an illumination system may be limited by the lights, the colors of lighting elements therein or the resolution of control that the system has over those lighting elements. For example, if an imaging system only has red and blue lighting elements, it may balance a red ambient light by providing blue illumination.

In addition to being a complementary color, the intensity of the illumination may be proportional to the intensity of the ambient light. In this manner, the imaging system may provide illumination that neutralizes the color of any ambient light. This can result in an image with realistic colors that aren't affected by the color tint of the ambient light.

At step 440, an image can be captured while illumination is being provided. An image can be captured by a camera (e.g., camera 120), converted to a digital format, and stored in the imaging system (e.g., on imaging device 110). The captured image may be color balanced because of the color and intensity of the illumination that was provided during image capture.

Information about the illumination (e.g., its color and intensity) that is provided when an image is captured may be appended to or part of the image data. This information may then be used at a later time, such as when a user editing the image. For example, a user may decide to remove the effects of the colored illumination and therefore show the effect of the ambient light.

Figure 5A:
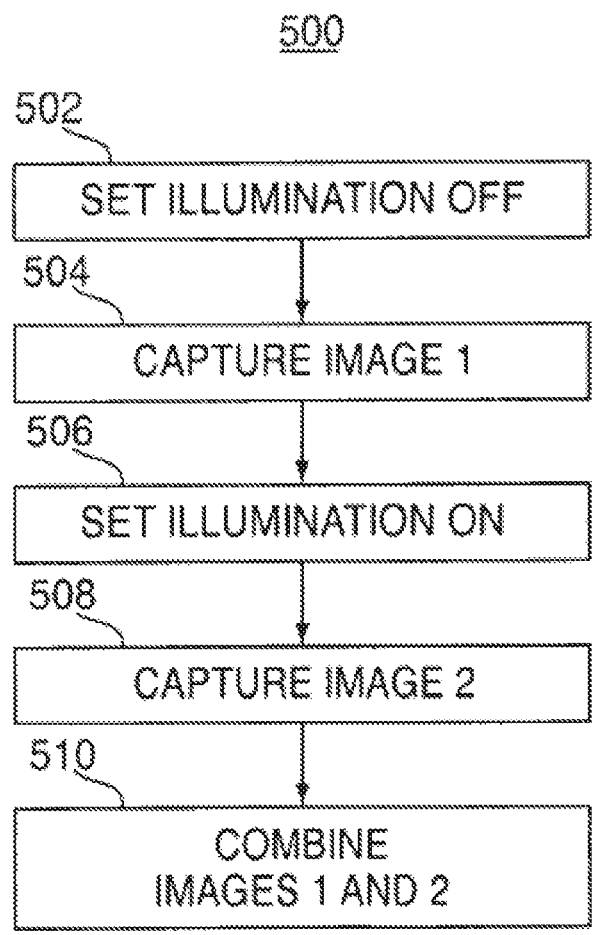
FIG. 5A is a flowchart of an illustrative method for capturing a digital image without any color from ambient light in accordance with an embodiment of the present invention.
Figure 5B:
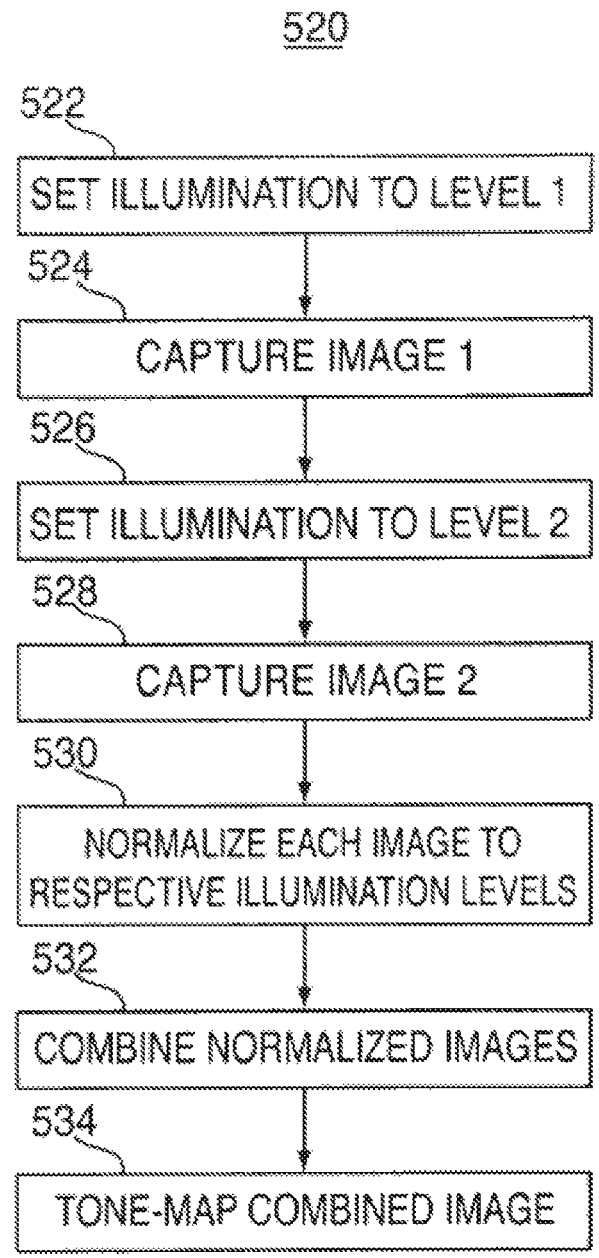
FIG. 5B is a flowchart of an illustrative method for providing a high dynamic range image in accordance with one embodiment of the present invention.

FIGS. 5A-5B show illustrative flowcharts of methods for capturing and combining images in accordance with embodiments of the present invention. In methods 500 and 520, illumination of a different color and/or intensity level can be provided when capturing each image before the images are combined. For example, a first image can be captured using one level of illumination, a second image can be captured using a second level of illumination, and both the first and second images can be combined to form a final image. In some embodiments, the different levels of illumination can be used to negate the color of ambient light in a scene. For example, subtracting a naturally illuminated image (e.g., captured with only ambient light) from a neutrally illuminated image (e.g., captured with neutral or white light from the imaging system) can minimize the effect of any ambient light.

When capturing a series of images to be combined later, there are certain qualities that can be advantageous in an imaging system. For example, it may be beneficial to use a system that can capture images in rapid succession such that the scene does not substantially change over the consecutive images. A change in the scene (e.g., a subject moving) create difficulties when combining the images. Additionally, it may be advantageous to use a system than can adjust illumination quickly so that the system is prepared to provide proper illumination for each image capture in a rapid, consecutive series.

In process 500, an imaging system can turn off the illumination (step 502) in order to capture a naturally illuminated image step 504). In step 506, the imaging system can turn on the illumination. For example, the illumination intensity and color level can be predetermined values or can be based on one or more factors discussed herein in accordance with the present invention (e.g., ambient light, color balance, etc.). The color and intensity of the light may be chosen so that it is sufficient to illuminate a scene with no ambient light. For example, the light's color may be a balanced white and the light's intensity may be bright enough to sufficiently illuminate the scene, assuming the absence of ambient light. At step 508, the imaging system can capture an image of the scene with the subject illuminated by the imaging system. Steps 502-508 may occur in rapid succession so that the scene does not change substantially between the two images. In some embodiments, an imaging system may instruct a user (e.g., using user interface 140) to remain still during image capture.

At step 510, the imaging system can combine the images captured in steps 504 and 508. An imaging system may include a processor (e.g., processor 112) application specific hardware for combining the images. The processor or application specific hardware that combines the images may be located anywhere in the imaging system (e.g., in camera 120 or imaging device 110).

In some embodiments, the imaging system may combine the images by subtracting the image captured in step 504 from the image captured in step 508. In such an embodiment, each image may have been captured the same amount of ambient light so that the subtracting one image from the other minimizes the effect of that light. Accordingly, the combined image may not include any effects of the ambient light when the images were captured. Such a process may be useful when, for example, the ambient light is tinted an undesirable color. For example, if the ambient light were substantially red, method 500 can be used to minimize the effect of the red light on the final image.

The combined image may be stored on the imaging system for later use. Data relating to the illumination and/or the time difference between the images may be stored with or appended to the image data. Such data may be useful when editing or analyzing the image.

FIG. 5B is a flowchart of an illustrative method for providing a high dynamic range image in accordance with one embodiment of the present invention. Currently, techniques are available to acquire a high dynamic range image by combining and tone-mapping multiple images of a scene captured by using various exposures. However, in some situations, may be inconvenient to adjust the exposure. Process 520 of the present invention can provide a high dynamic range image by combining multiple images of the scene taken at various illumination intensity or brightness levels (instead of or in addition to varying the exposure). The images can be combined and tone-mapped, generating an image that is truer to what is seen by human eyes, which naturally have high dynamic range.

At steps 522 and 524, an imaging device of the present invention can set the illumination brightness or intensity level to a first value and capture an image of the scene at that first illumination level. At steps 526 and 528, the imaging device can set the illumination brightness or intensity level to a second value and capture an image of the scene at that second illumination level.

At step 530, the imaging device can normalize each image to its respective illumination level. In one embodiment, the value for each color of each pixel of each captured image can be divided by the relative illumination brightness or intensity level used to capture the image. For example, if the image captured in step 524 has an illumination level of unity and the age captured in step 528 has an illumination level that is 256 times brighter, then the value of each color of each pixel of the image captured in step 528 can be divided by 256.

Thereafter, in step 532, the imaging device can combine the normalized images. For example, the imaging device can add the normalized values for each color of corresponding pixels of all of the captured images. In step 534, the imaging device can tone-map the combined images using techniques employed, for example, in computer graphics and photography.

While process 520 shown in FIG. 5B illustrates only two images captured using two illumination brightness or intensity levels, an imaging system of the present invention also can capture more images using more illumination brightness or intensity levels. For example, an 8-bit imaging device of the present invention can capture three images of a scene using three different illumination brightness or intensity levels: bright illumination (e.g., the unity level), illumination at a quarter of the unity level, and illumination at four times the unity level. The images can be normalized and combined, thereby generating an image with 4 additional bits—2 bits from each of the two extra exposures. Each factor of two in brightness is one additional bite. The combined image then can be tone-mapped back into 8 bits of normal contrast range for display and storage.

In an alternative embodiment of the present invention, the imaging device also can be configured to adjust the exposure of the camera along with the illumination brightness or intensity level to capture multiple images of the same scene.

Figure 6:
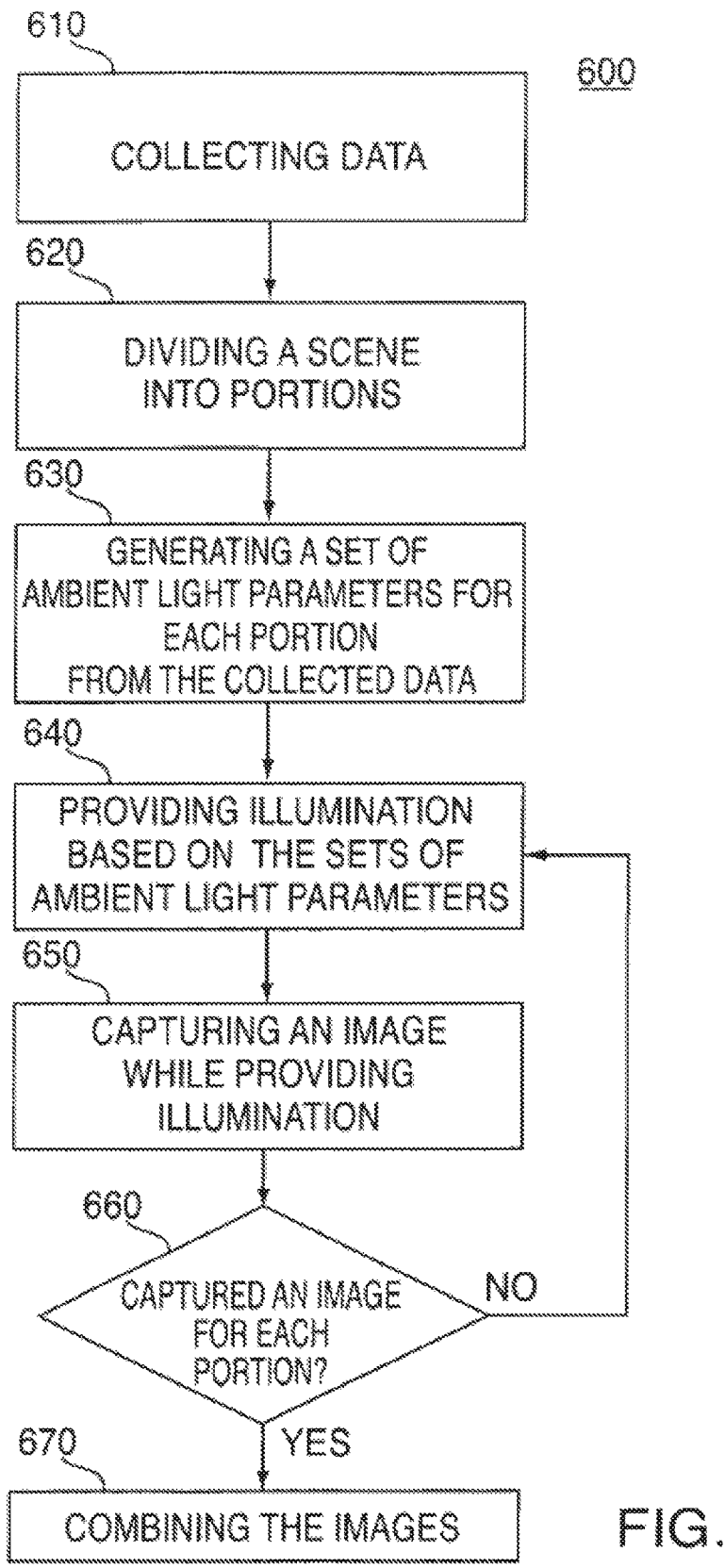
FIG. 6 is a flowchart of an illustrative method for capturing an image of a scene having high dynamic range in accordance with an embodiment of the present invention.

In some embodiments, an imaging system may use a particular method to capture images of scenes that include a wide range of ambient light. For example, different types of illumination can be used to generate images that each properly captures a different portion of a scene. These images can then be combined to form one image that depicts the entire scene. FIG. 6 shows an illustrative flowchart of method 600 for capturing and combining images in accordance with one embodiment of the present invention.

Like methods 500 and 520, method 600 involves capturing a series of images and then combining the images, and the same qualities, such as image capture speed and illumination adjustment speed, are desirous in an imaging system for the aforementioned reasons.

At step 610, data is collected. Step 610 is similar to step 410 of method 400 and the previous description of step 410 can be applied to step 610.

At step 620, a scene is divided into portions. In some embodiments, an imaging system can analyze a scene to identify regions of the scene with substantially different ambient light (e.g., regions where the color and/or intensity of ambient light differs more than some predetermined threshold). It may be advantageous to define the boundaries of these regions based on the particular scene. For example, system may identify groups of pixels in a scene that have a similar level of color pixel saturation (e.g., in red, green, and/or blue) and define that group of pixels as a region. The system can then record the boundaries of these regions such that an image of the scene can be divided into specially defined portions. Accordingly, an imaging system may divide an image into portions that are shaped to fit the particular regions of the scene (e.g., a shape that follows the boundary between two different ambient light regions). For example, if a person in the foreground of a scene is in a shadow and the background of the scene is brightly lit, an imaging system may divide an image of the scene into different portions with the boundary being the outline of the person in the foreground.

In some embodiments, an imaging system can divide an image into pre-defined portions. (e.g., a grid of four or a eight portions) and analyze each portion to determine the amount of ambient light. If an imaging system determines that some of the pre-defined portions have similar amounts of ambient light, those portions may be grouped together to form a larger portion. Using pre-defined portions may be less precise in defining the ambient light regions of a scene but may require less processing power. For example, it may require significantly less processing power to average the color pixel saturation (e.g., in red, green, and/or blue) of each pre-defined portion rather than analyzing an entire image and defining the boundaries of each region.

At step 630, a set of ambient light parameters are generated for each portion of the image. The ambient light parameters may be generated from the collected data. Step 630 can be understood as carrying cut step 420 of method 400 for each portion of the image. Accordingly, the previous description of step 420 can be applied to the generation of parameters in step 630 with the understanding that each portion of the scene in step 630 corresponds to the entire image in the discussion of step 420. For example, each portion of the image in step 630 may be analyzed as independent image for the purposes of generating a set of ambient light parameters.

At step 640, illumination may be provided based on one of the sets of ambient light parameters. At step 650, an image may be captured while illumination is being provided. Steps 640 and 650 are similar to, respectively, steps 430 and 440. Accordingly, the previous description of steps 430 and 440 can be applied, respectively, to steps 640 and 650.

At step 660, method 600 may diverge depending on how many portions the scene was divided into in step 620 and how many images have been captured thus far. If an image has not been captured for each portion, method 600 may proceed with step 640 and the scene may be illuminated according to a new set of parameters. At step 650, a new image can be captured and this illumination and capturing sequence can repeat until an image for each portion has been captured. Steps 640, 650 and 660 may occur in rapid succession so that the scene does not change substantially between each captured image. In some embodiments, an imaging system may instruct a user (e.g., using user interface 140) to remain still during image capture.

It is understood that the number of scene portions may be limited so that the system can reasonably capture an image for each portion in a short amount of time. For example, an imaging system may limit the number of portions that a scene can be divided into at four so that the system has time to capture a series of four images without the scene substantially changing. Once an image has been captured for each portion, method 600 may proceed with step 670.

At step 670 the images may be combined. An Imaging system may include a processor (e.g., processor 112) or application specific hardware for combining the images. The processor or application specific hardware that combines the images may be located anywhere in the imaging system (e.g., in camera 120 or imaging device 110). In some embodiments, the images may be combined such that the relevant portion of each image is merged together to create a combined image that depicts the entire scene. In combining the images, the boundaries of each region can be used to determine which portion of each image should be in the combined image. In some embodiments, each image portion might not be cropped precisely the boundary of a region but fade or feather into the neighboring region so that the combined image does not have any abrupt transitions between the different portions.

The combined image may be stored on the imaging system for late use. Data relating to the image portion boundaries, corresponding illumination for each portion and/or the time difference between the images may be stored with or appended to the image data. Such data may be useful when editing or analyzing the image.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A method of performing a video-conference, comprising:

establishing, by an image capture device, a communication with at least one external device to perform a video-conference;

displaying an image associated with the video-conference in a first portion of a display of the image capture device;

designating a second portion of the display as an adjustable illumination source;

providing illumination, by the second portion of the display, to illuminate a scene; and capturing a video of the scene, by an image sensor of the image capture device, to be transmitted in the video-conference, wherein the first portion of the display is non-overlapping with the designated second portion of the display.

2. The method of claim 1, further comprising:
adjusting a brightness level of the second portion of the display.

3. The method of claim 1, further comprising:
adjusting a color of the second portion of the display.

4. The method of claim 1, further comprising:
analyzing the captured video of the scene; and
adjusting the illumination of the second portion of the display based on the analysis of the captured video of the scene.

5. The method of claim 4, wherein analyzing the captured video of the scene comprises analyzing a color balance of the captured video of the scene.

6. The method of claim 1, wherein the image associated with the video-conference is the captured scene.

7. The method of claim 1, further comprising:
collecting, by one or more photodetectors of the image capture device, data regarding a level of ambient light in the scene; and
adjusting the illumination of the second portion of the display based on the collected data.

8. An electronic device, comprising:
an image sensor;
a display;
a memory coupled to the image sensor;
a processor coupled to the display, the image sensor, and the memory and configured to execute instructions to cause the electronic device to:
establish a communication with at least one external device to perform a video-conference;
display an image associated with the video-conference in a first portion of the display;
designate a second portion of the display as an adjustable illumination source;
cause the second portion of the display to provide illumination to illuminate a scene; and
cause the image sensor to capture a video of the scene to be transmitted in the video-conference,
wherein the first portion of the display is non-overlapping with the designated second portion of the display.

9. The electronic device of claim 8, wherein the processor is further configured to execute instructions to cause the electronic device to:
adjust a brightness level of the second portion of the display.

10. The electronic device of claim 8, wherein the processor is further configured to execute instructions to cause the electronic device to:
adjust a color of the second portion of the display.

11. The electronic device of claim 8, wherein the processor is further configured to execute instructions to cause the electronic device to:
analyze the captured video of the scene; and
adjust the illumination of the second portion of the display based on the analysis of the captured video of the scene.

12. The electronic device of claim 11, wherein the processor being configured to execute instructions to cause the electronic device to analyze the captured video of the scene comprises the processor being configured to execute instructions to cause the electronic device to analyze a color balance of the captured video of the scene.

13. The electronic device of claim 8, wherein the image associated with the video-conference is the captured scene.

14. The electronic device of claim 8, wherein the processor is further configured to execute instructions to cause the electronic device to:
cause one or more photodetectors of the electronic device to collect data regarding a level of ambient light in the scene; and
adjust the illumination of the second portion of the display based on the collected data.

15. A non-transitory program storage device, readable by a programmable control device and comprising instructions stored thereon to cause one or more processing units to:
establish a communication with at least one external device to perform a video-conference;
display an image associated with the video-conference in a first portion of a display of an electronic device;
designate a second portion of the display as an adjustable illumination source;
cause the second portion of the display to provide illumination to illuminate a scene; and
cause an image sensor of the electronic device to capture a video of the scene to be transmitted in the video-conference,
wherein the first portion of the display is non-overlapping with the designated second portion of the display.

16. The non-transitory program storage device of claim 15, further comprising instructions to cause the one or more processing units to:
adjust a color of the second portion of the display.

17. The non-transitory program storage device of claim 15, further comprising instructions to cause the one or more processing units to:
adjust a brightness level of the second portion of the display.

18. The non-transitory program storage device of claim 15, further comprising instructions to cause the one or more processing units to:
analyze the captured video of the scene; and
adjust the illumination of the second portion of the display based on the analysis of the captured video of the scene.

19. The non-transitory program storage device of claim 18, wherein the instructions to cause the one or more processing units to analyze the captured video of the scene comprise instructions to cause the one or more processing units to analyze a color balance of the captured video of the scene.

20. The non-transitory program storage device of claim 15, wherein the image associated with the video-conference is the captured scene.

* * * * *